United States Patent Office 3,403,178
Patented Sept. 24, 1968

---

3,403,178
PREPARATION OF α-HYDROXY-
CARBOXYLIC ACIDS
Theodor Völker and Klaus Hering, Freiburg, Switzerland,
assignors to Lonza Ltd., Gampel, Basel, Switzerland
No Drawing. Filed July 9, 1965, Ser. No. 470,896
Claims priority, application Switzerland, July 9, 1964,
9,039/64
4 Claims. (Cl. 260—535)

ABSTRACT OF THE DISCLOSURE

Alpha-hydroxycarboxylic acids are prepared by contacting the alpha-oximation product of a 2,2,5,5-tetrasubstituted - 3-oxotetrahydrofuran with concentrated sulfuric acid.

---

This invention relates to a process for the preparation of disubstituted aliphatic α-hydroxycarboxylic acids and its derivates.

It is known to convert 2,2,5,5-tetrasubstituted-3-oxotetrahydrofurans by oxidation with $KMnO_4$ or $HNO_3$ into the corresponding ether dicarboxylic acids and to obtain disubstituted α-hydroxycarboxylic acids from said ether dicarboxylic acids by ether cleavage. The yield of said first stage of the process is only about 30 percent, which makes the entire process unsatisfactory.

We have found that disubstituted α-hydroxycarboxylic acids and its derivates of the formula

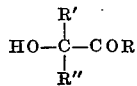

wherein R may be —OH, —$NH_2$ or an O-alkyl radical with 1 to 4 carbon atoms and R' and R" are alkyl, aryl or alkenyl groups, can be obtained when a 2,2,5,5-tetrasubstituted-3-oxotetrahydrofuran is converted into the corresponding α-oximation product of the formula

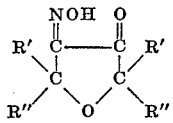

and when said α-oximation product is then treated at a temperature of —5° C. to +70° C. with concentrated sulfuric acid with a $H_2SO_4$ content of at least 85 percent by weight.

In order to avoid decomposition, the reaction temperature, and also the temperature for the neutralization of the sulfuric acid after completion of the reaction, should be kept as low as possible.

The tetrasubstituted 3-oxotetrahydrofuran may be prepared by addition of 2 moles of ketone to 1 mole of acetylene and rearrangement of the obtained tetrasubstituted hexynediol in presence of a soluble mercury (II) catalyst to the water insoluble 2,2,5,5-tetrasubstituted 3-oxotetrafuran. If the latter is reacted with nitric acid or an organic ester thereof, such as amyl nitrite, or a halide or anhydride of nitric acid, such as nitrosyl chloride, the following reaction takes place

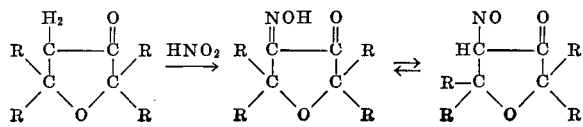

From this equation, it will be noted that the compound we call the α-oximation product is present in tautomeric equilibrium with the α-nitrosation product. When first described in the paper by H. Richet, R. Dulou, and G. Dupont, Halogenated Derivatives of Tetramethylketofuran, Bull. Soc. Chim. France (Mémoires 5 Series, vol. 14, 1947, page 697, under No. XII) the compound was called the oxime, and for this reason we call it here also the oxime though it may be also designated the nitroso derivative.

It should be noted that the reaction appears to be limited to concentrated sulfuric acid. If other concentrated acids are used, such as phosphoric or nitric acid, mononitrile-mono-carboxylic acids are obtained, as set forth in application Ser. No. 462,749, filed June 9, 1965 by us. If sulfuric acid is used which contains more than 15 percent of water, the α-oximation products are quickly and irreversibly converted to the corresponding tetrasubstituted α,α'-diketotetrahydrofurans.

The upper concentration of the sulfuric acid is not limited and it is also possible to use oleum. If oleum is used it may be advantageous to keep the reaction temperature low.

The amount of sulfuric acid or oleum is not very critical, but it is preferred to use a mole ratio calculated as $H_2SO_4$ to α-oximation product from 1:1 to 1:10.

Sometimes, it may be of advantage for operative reasons (better stirring and the like) to dilute the sulfuric acid by organic solvents such as aliphatic or aromatic hydrocarbons, e.g., n-hexane, benzene, toluene, xylene, ketones, e.g., dimethylketone, methylethylketone, and others. In such case, the amount of solvent should not exceed 60 percent, calculated on the weight of the sulfuric acid. Stronger dilution will reduce the yield of the α-hydroxycarboxylic acid by formation of dimers such as dimethylether-2,2,5,5-tetrasubstituted α,α'-dicarboxylic acid imide.

By working with sulfuric acid alone or with small amounts of organic inert solvents in all cases a mixture of α-hydroxycarboxylic acid and α-hydroxycarboxylic acid amide is produced. The latter can be hydrolyzed by mineral acids to α-hydroxycarboxylic acid, e.g., by HCl in a concentration from about 20 to 25 percent.

If alcohols are employed as diluents for the sulfuric acid, the corresponding esters of the α-hydroxycarboxylic acids are obtained.

Both the α-hydroxycarboxylic acids and their esters are valuable starting materials for the manufacture of methacrylic acid and its higher homologs, and the esters thereof.

The following examples are given to illustrate the process of this invention but are not intended as limitations; there are numerous variations possible in the proportions and operating conditions without departing from the scope of this invention.

Example 1

0.0585 mole (=10 g.) of the α-oximation product of 2,2,5,5-tetramethyl-3-oxotetrahydrofuran are added in increments and with stirring to 50 g. of 96% $H_2SO_4$, precooled to —2° C. An exothermic reaction takes place at once, and strong external cooling is applied during the reaction. Due to some side reactions, a small amount of HCN is split off. The reaction is terminated after a few minutes, which is shown in a change of the color from yellow to colorless. The employed sulfuric acid is then neutralized under cooling with the calculated exactly equimolar amount of alkali metal hydroxide, e.g., in form of 35% NaOH.

By concentrating the residue and shaking with benzene or dichloroethylene, a mixture of α-hydroxybutyric acid amide and α-hydroxybutyric acid can be directly recovered in a yield of 83% of theory; with 200 ml. of 22% HCl, only α-hydrobutyric acid is obtained as a 98% raw product in a yield of 81.8%.

Example 2

When the α-oximation product of 2,5-dimethyl-2,5-diethyl-3-oxotetrahydrofuran is used as starting material in the procedure of Example 1, the corresponding α-hydroxy-methyl-ethyl acetic acid and α-hydroxy-methyl-ethyl acetic acid amide is obtained in a yield of 80%. The latter may be hydrolyzed with a mineral acid to α-hydroxy-methyl-ethyl acetic acid.

We claim:
1. A process for the preparation of α-hydroxycarboxylic acid and its derivatives of the formula

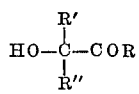

wherein R is a member of the group consisting of —OH and —NH₂ and wherein R' and R" are lower alkyl comprising contacting an α-oximation product of a 2,2,5,5-tetrasubstituted-3-oxotetrahydrofuran of the formula

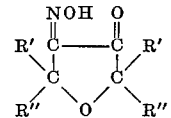

at a temperature of —5° to 70° C. with concentrated sulfuric acid having an H₂SO₄ content of at least 85 percent by weight.

2. The process as claimed in claim 1 comprising contacting said α-oximation product at a temperature of —5° C. to 70° C. with oleum.

3. The process claimed in claim 1 comprising adding to said sulfuric acid as diluent an organic solvent in an amount of less than 60 percent, calculated on the weight of H₂SO₄.

4. The process as claimed in claim 3 wherein said diluent is an alcohol.

References Cited

Richet et al.: Bull. Soc. Chim. France (Mémoires 5. Series, vol. 14, pages 693–699 (1947).

LORRAINE A. WEINBERGER, *Primary Examiner.*

A. P. HALLUIN, *Assistant Examiner.*